United States Patent
Muppirala et al.

(10) Patent No.: US 10,776,030 B2
(45) Date of Patent: Sep. 15, 2020

(54) QUOTA ARBITRATION OF A DISTRIBUTED FILE SYSTEM

(71) Applicant: HEWLETT PACKARD ENTERPRISE DEVELOPMENT LP, Houston, TX (US)

(72) Inventors: Kishore Kumar Muppirala, Bangalore (IN); Shankar Raman, Bangalore (IN); Narayanan Ananthakrishnan Nellayi, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 231 days.

(21) Appl. No.: 16/068,357

(22) PCT Filed: Mar. 30, 2016

(86) PCT No.: PCT/US2016/024830
§ 371 (c)(1),
(2) Date: Jul. 5, 2018

(87) PCT Pub. No.: WO2017/131800
PCT Pub. Date: Aug. 3, 2017

(65) Prior Publication Data
US 2019/0018606 A1 Jan. 17, 2019

(30) Foreign Application Priority Data
Jan. 29, 2016 (IN) .............................. 201641003240

(51) Int. Cl.
*G06F 16/10* (2019.01)
*G06F 3/06* (2006.01)
(Continued)

(52) U.S. Cl.
CPC .......... *G06F 3/0643* (2013.01); *G06F 3/0604* (2013.01); *G06F 3/0605* (2013.01);
(Continued)

(58) Field of Classification Search
None
See application file for complete search history.

(56) References Cited

U.S. PATENT DOCUMENTS 5,956,734 A 9/1999 Schmuck et al.
7,290,053 B2 10/2007 Nanda et al.
(Continued)

FOREIGN PATENT DOCUMENTS

WO WO-2010033644 A1 3/2010

OTHER PUBLICATIONS

B.S. Amarnath, "Scalable Quota Management for High Performance Computing," Aug. 2012, pp. 1-61, Thesis, Indian Institute of Science, Bangalore, India.
(Continued)

*Primary Examiner* — Jau Shya Meng
(74) *Attorney, Agent, or Firm* — Hewlett Packard Enterprise Patent Department

(57) ABSTRACT

An system for quota arbitration of a distributed file system (DFS) may obtain a current amount of storage used by a given quota entity on storage segments of the DFS, the given quota entity having a global quota for the DFS and each of the storage segments being assigned a respective first quota limit for the given quota entity. The system may determine a global available quota amount for the given quota entity across all the storage segments based on the obtained current amounts of storage used by the given quota entity and the global quota, and provision of a respective second quota limit for the given quota entity to each of the plurality of storage segments, based on a division of all or less than all of the global available quota amount.

16 Claims, 3 Drawing Sheets

(51) Int. Cl.
*G06F 17/40* (2006.01)
*G06F 16/182* (2019.01)

(52) U.S. Cl.
CPC ............ *G06F 3/067* (2013.01); *G06F 3/0622* (2013.01); *G06F 3/0631* (2013.01); *G06F 16/182* (2019.01); *G06F 17/40* (2013.01)

(56) References Cited

U.S. PATENT DOCUMENTS

| | | | |
|---|---|---|---|
| 8,131,784 B1 | 3/2012 | Zhuge et al. | |
| 8,892,507 B1 | 11/2014 | Dwyer, III et al. | |
| 2003/0093439 A1* | 5/2003 | Mogi | G06F 16/22 |
| 2008/0077817 A1 | 3/2008 | Brundridge et al. | |
| 2011/0119461 A1 | 5/2011 | Desai et al. | |
| 2012/0066179 A1 | 3/2012 | Saika | |
| 2012/0272237 A1 | 10/2012 | Baron | |
| 2013/0067187 A1* | 3/2013 | Moss | G06F 3/0665 711/170 |
| 2013/0117522 A1* | 5/2013 | Schreter | G06F 9/5016 711/170 |
| 2014/0149475 A1 | 5/2014 | Darcy et al. | |
| 2015/0033224 A1* | 1/2015 | Maheshwari | G06F 9/45533 718/1 |
| 2015/0301903 A1* | 10/2015 | Mutha | G06F 11/1453 707/692 |

OTHER PUBLICATIONS

EMC Corporation, "EMC Isilon Smartquotas," Specification Sheet, Apr. 2013, pp. 1-2.

IBRIX, Inc., "IBRIX Fusion User Guide," May 2009, pp. 1-120, Document IF001-4.3, USA.

International Search Report and Written Opinion, International Application No. PCT/US2016/024830, dated Oct. 28, 2016, pp. 1-11, KIPO.

John H. Howard et al., "Scale and Performance in a Distributed File System," ACM Transactions on Computer Systems, Feb. 1988, pp, 51-81, vol. 6, No. 1, ACM.

Kristal T. Pollack et al., "Quota Enforcement for High-Performance Distributed Storage Systems," 24th IEEE Conference on Mass Storage Systems and Technologies, 2007, pp. 1-13, IEEE.

Ozgur Can Leonard et al., "The Design and Implementation of Elastic Quotas: A System for Flexible File System Management," Columbia University Technical Report CUCS-014-02, Jun. 2002, pp. 1-14.

Wikipedia "Picture Archiving and Communication System," Nov. 23, 2015, pp. 1-9 (online), Retrieved from the Internet on Jan. 12, 2016 at URL: <en.wikipedia.org/w/index.php?title=Picture_archiving_and_communication_system&oldid=692105130>.

* cited by examiner

QUOTA ARBITRATION OF A DISTRIBUTED FILE SYSTEM

BACKGROUND

A computer system may store data in a file system, which may store data in files organized into directories. In some examples, the file system may implement a hierarchical structure of directories. A file system may also store metadata associated with other data in the file system. For example, the file system may additionally store in the file system metadata related to each file and directory of the file system. Examples of such metadata may include information related to or otherwise about a given file or directory in the file system, such as its owner, size, modify time, and the like.

BRIEF DESCRIPTION OF THE DRAWINGS

The following detailed description references the drawings, wherein.

DETAILED DESCRIPTION

Figure 1:
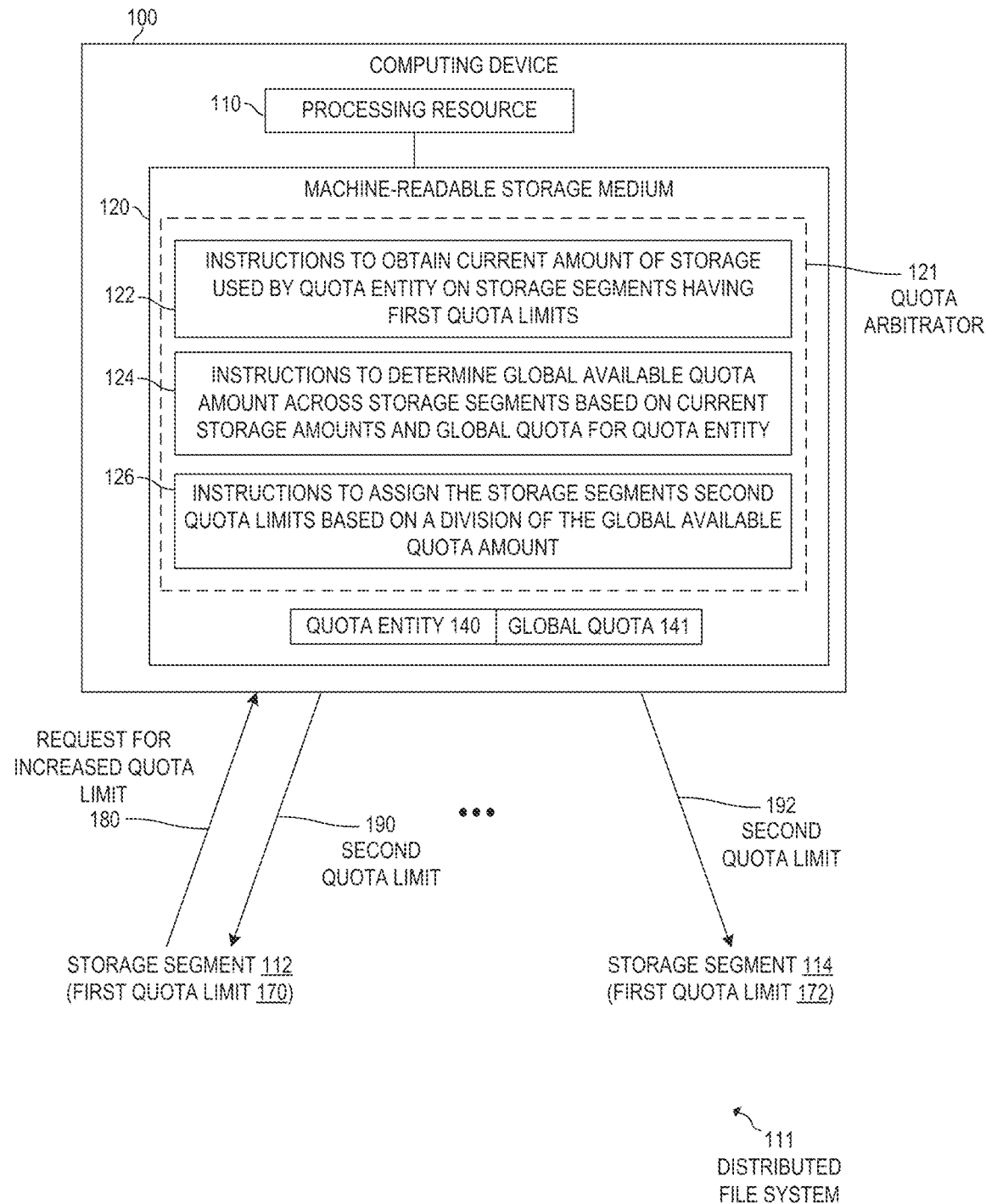
FIG. 1 is a block diagram of an example computing device including a quota arbitrator of a distributed file system (DFS) to assign quota limits for quota entities.

A computing device may store data in a file system, which may store data in files, directories, or other "file system objects", and may store various metadata associated with each file system object. In some examples, computing device(s) may store data in a distributed file system (DFS) providing global file system namespace semantics for the storage of the DFS, wherein different portions of storage of the overall DFS are physically separate from one another, logically separate from one another, or a combination thereof, though accessible to global functionalities of the DFS (e.g., via at least one computer network). In some examples, a DFS may include a plurality of storage nodes, each to manage one or more storage segments of the DFS. In some examples, the storage nodes may be physically or logically separate or remote from one another (or a combination thereof) but accessible to one another or to at least one storage node implementing global functions for the DFS (e.g., via at least one computer network). In examples described herein, a storage node may comprise at least one computing device to implement the functionalities of the storage node, including locally managing one or more storage segments of the DFS. In other examples, storage nodes may be implemented by a combination of separate physical computing devices and different logical computing devices (e.g., virtual machines or the like). In examples described herein, a "storage segment" may be a discrete physical and/or logical portion of storage in a DFS that implements its own independent local file system specific to that portion of storage. In some examples, different storage segments may be implemented by different storage devices (e.g., different physical disks, drives, etc.), by different portions of a single storage device, or a combination thereof. In some examples, a storage segment managed by an associated storage node may be implemented by at least one storage device physically connected locally to a computing device implementing the storage node, or may be implemented by a portion of a storage array (e.g., a given logical unit of storage identified by a given logical unit number (LUN)).

In a DFS, it may be desirable to enforce quotas on the amount of storage that individual quota entities (e.g., users, groups, etc.) may use in the DFS in order to control use of the storage in a desirable manner, for example. In examples described herein, a "quota entity" may be any entity in a DFS against which a storage quota may be applied. Example quota entities may include individual users defined for the DFS, groups of users defined for the DFS, directories defined for the DFS (i.e., of the DFS global namespace), or the like. Using a centralized quota enforcement mechanism to enforce the quotas for all write operations would not be desirable, as it is likely to be a bottleneck that may significantly slow the performance of the DFS.

However, it may be undesirable to allow separate storage components (such as storage nodes and storage segments) to make autonomous decisions regarding quota enforcement when storing data, as lack of coordination may result in a user, group, or other quota entity exceeding its defined quota when multiple write operations for a given quota entity happen near in time at multiple different segments. For example, if a user has 1 MB of storage remaining globally before meeting its defined global, and two different storage segments decide to use the 1 MB at approximately the same time, then the user is likely to exceed its global quota by 1 MB. In some examples, exceeding the quota can be problematic, as overshooting specified storage quotas can cause some applications to fail.

To address these issues, examples described herein may include a quota arbitrator of a DFS to, in response to a request for an increased quota limit for a given quota entity on a given storage segment, obtain, for each of a plurality of storage segments of the DFS associated with the given quota entity, a current amount of storage used by the given quota entity on the storage segment. In such examples, the given quota entity may have a global quota for the DFS and each of the storage segments may be assigned a respective first quota limit for the given quota entity. In such examples, the quota arbitrator may determine a global available quota amount for the given quota entity across all the storage segments based on the obtained current amounts of storage used by the given quota entity and the global quota, and may assign each of the plurality of storage segments a respective second quota limit for the given quota entity, the second quota limits being based on a division of all or less than all of the global available quota amount. In such examples, the aggregate of the quota limits provided per segment for a given quota entity do not exceed the global quota for the given quota entity.

In such examples, in response to a request for an increase in a quota limit for a given quota entity, the quota arbitrator may determine the actual current quota usage for that quota entity across each individual storage segment, and assign portions of the currently unused global quota amount to individual storage segments for use. In this manner, using the quota limits updated in this manner, storage nodes managing the storage segments can make quota enforcement decisions (i.e., allow or disallow write operation(s)) independently based on the local quota limits without overshooting the global quota limit for any given quota entity. In addition, by accumulating the actual usage at each segment for a given quota entity in response to a request for an increased quota limit, examples described herein may efficiently maintain local quota limits for individual segments in a manner that may reduce levels of communication between a quota arbitrator and individual storage nodes.

Referring now to the drawings, FIG. 1 is a block diagram of an example computing device 100 including a quota arbitrator 121 of a DFS 111 to assign quota limits for quota entities. Computing device 100 includes a processing resource 110 and a machine-readable storage medium 120 comprising (e.g., encoded with) instructions implementing a quota arbitrator 121, including instructions 122, 124, and 126. Instructions 121 (including instructions 122, 124, and 126) are executable by processing resource 110 to implement functionalities described herein in relation to FIG. 1. In some examples, storage medium 120 may include additional instructions. In other examples, the functionalities described herein in relation to instructions 121, 122, 124, 126, and any additional instructions described herein in relation to storage medium 120, may be implemented at least in part in electronic circuitry (e.g., via engines comprising any combination of hardware and programming to implement the functionalities of the engines, as described below). Computing device 100 may include network interface device(s) to communicate with other computing resource(s) (e.g., computing device(s)) via at least one computer network. As described herein, a computer network may include, for example, a local area network (LAN), a virtual LAN (VLAN), a wireless local area network (WLAN), a virtual private network (VPN), the Internet, or the like, or a combination thereof.

In the example of FIG. 1, DFS 111 may include computing device 100, including quota arbitrator 121, and multiple storage segments as described above. In the example of FIG. 1, DFS 111 may store global quotas assigned to a plurality of quota entities of DFS 111, respectively. In examples described herein, a "global quota" is a defined limit on the amount of storage that an associated quota entity may use in a DFS. In examples described herein, a quota arbitrator 121 of DFS 111 may store the global quotas in any suitable manner such that they are accessible to quota arbitrator 121. For example, quota arbitrator 121 may store the global quotas in memory of computing device 100. In examples described herein, any "memory" may be implemented by at least one machine-readable storage medium. A memory storing the global quotas may be the same as or separate from storage medium 120.

In the example of FIG. 1, for each global quota assigned to a given quota entity, all or less than all of the global quota may be divided into a plurality of quota limits assigned to respective storage segments of DFS 111 and which, when aggregated, do not exceed the global quota. In example described herein, a "quota limit" is a storage limit assigned to a particular segment of a DFS for an associated quota entity (e.g., user, group, directory, etc.) and which the DFS is to enforce while the limit is in effect such that the defined storage limit is not exceeded on the particular segment for the associated quota entity. In some examples, for each storage segment, the quota limits assigned to that storage segment may be maintained by a storage node that manages the storage segment. In such examples, the storage node may maintain and enforce each current quota limit assigned to the storage segment. For example, the storage node may prevent any write operation that would cause a quota limit that is currently in force to be exceeded, or in other examples, that would cause a soft limit or threshold less than the current quota limit (e.g., 90% or 95% of the quota limit) to be exceeded. In some examples, the storage nodes may also maintain, for each storage segment that it manages, the amount(s) of storage used on the storage segment for each quota entity that has associated data stored on the storage segment.

In examples described herein, global quotas and quota limits may be defined in terms of blocks of data (e.g., a fixed number of bits, bytes, etc.), files, bytes (including multiples of bytes, such as KB, MB, GB, TB, etc.), or any other suitable measure of storage. Additionally, there may be multiple types of global quotas and quota limits for a particular quota entity. For example, a given quota entity may have both a global quota limiting storage in term of blocks (and corresponding quota limits assigned to storage segments) and another global quota limiting storage in terms of files (and corresponding quota limits assigned to storage segments), each of which may be enforced by DFS 111 independently. In some examples, a quota on the number of files for a quota entity may be enforced by a DFS based on the number of metadata nodes (e.g., inodes or v-nodes) stored for (i.e., associated with) the quota entity. For example, if a given user has a global quota of 100 files, then the DFS may permit the user to store up to 100 inodes (or other metadata nodes). In addition, quota entities may overlap in some senses. For example, a given user of DFS 111 (i.e., a quota entity) may be part of a group of users defined for the DFS 111 (i.e., another quota entity), and each may store data in a given directory (i.e., another quota entity). In examples described herein, the quotas for these overlapping quota entities are enforced independently, and the quota limits are updated for these quota entities separately.

For purposes of illustration, the example of FIG. 1 will be explained in relation to a global quota and quota limits for a given quota entity (e.g., user, group, directory, etc.) of DFS 111. In the example of FIG. 1, quota arbitrator 121 may store a global quota 141 for a given quota entity 140 (e.g., a user 140, etc.) of DFS 111. Some or all of global quota 141 may be divided into first quota limits for storage segments of DFS 111, including at least a first quota limit 170 assigned to storage segment 112 for quota entity 140 and a first quota limit 172 assigned to storage segment 114 for quota entity 140. In such examples, first quota limit 170 may be used by a storage node managing storage segment 112 as a local limit on the amount of storage that quota entity 140 may use on storage segment 112, and first quota limit 172 may be used by a storage node managing storage segment 114 as a local limit on the amount of storage that quota entity 140 may use on storage segment 114. In some examples, other storage segments of the DFS may also be assigned respective first quota limits for quota entity 140, divided from global quota 141, wherein the aggregate of all the first quota limits is no greater than the global quota 141.

Figure 2:
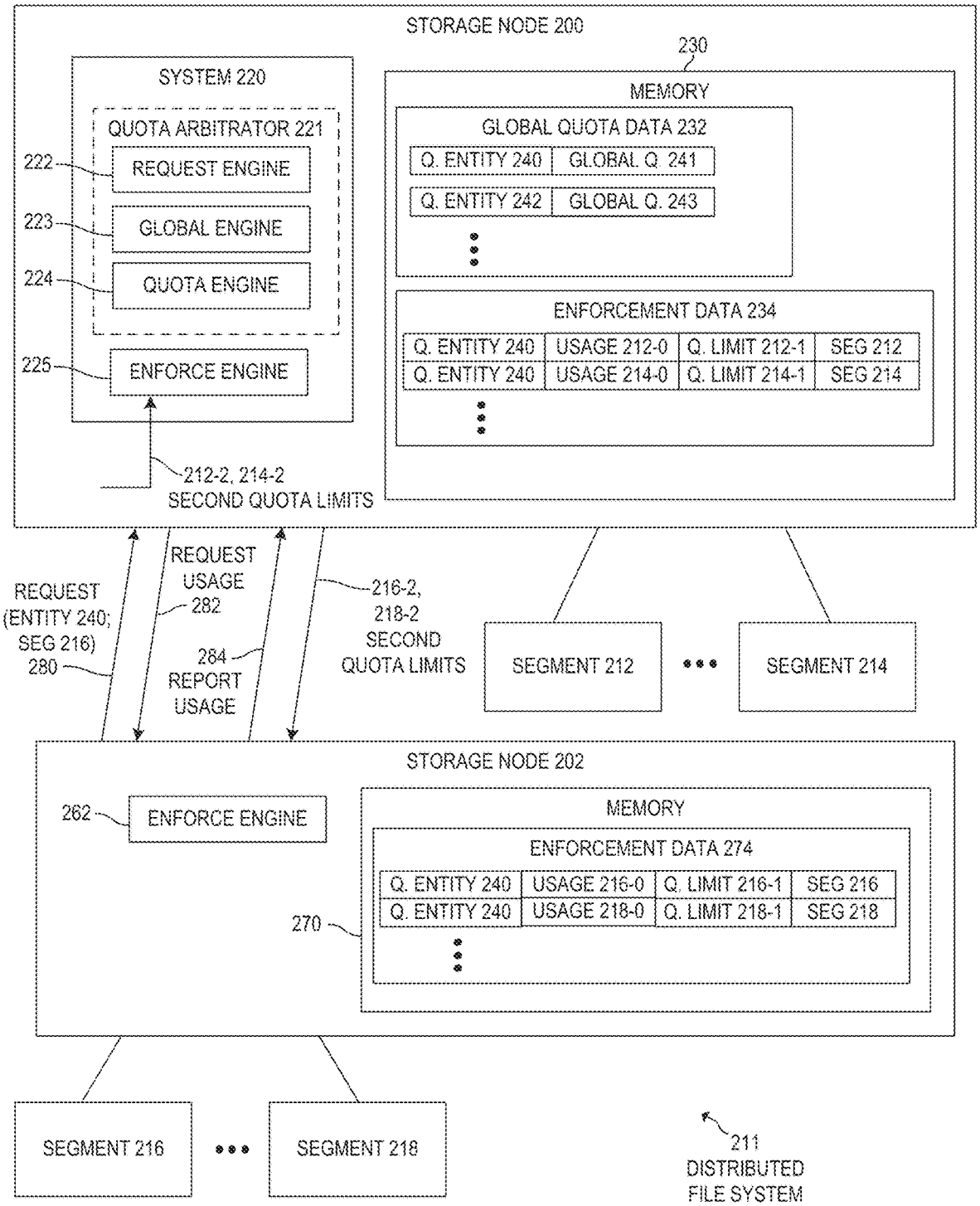
FIG. 2 is a block diagram of an example DFS including storage nodes to manage storage segments, and a quota arbitrator to provide quota limits for quota entities on storage segments.

In some examples, the storage segments of DFS 111 may be managed by storage nodes (e.g., as shown in FIG. 2). In some examples, computing device 100 may implement one of the storage nodes of DFS 111. In the example of FIG. 1, other storage nodes are not explicitly shown.

In some examples, storage nodes managing storage segments of DFS 111 may enforce the first quota limits. For example, in response to a write operation requested in relation to quota entity 140, before allowing or proceeding with the write operation on a given storage segment, a storage node receiving the request may check the current usage of the quota entity 140 on the storage segment and the first quota limit for the quota entity, to determine whether allowing the write would cause the first quota limit to be exceeded for quota entity 140 on the storage segment. If allowing the write would not cause the quota limit to be exceeded, then the storage node may allow or perform the write operation on the given storage segment. However, if allowing the write would cause the quota limit to be exceeded, then the storage node may not allow or perform the write operation immediately. Rather, the storage node may request an increased quota limit for quota entity 140 on the given storage segment, and, for example, complete the write operation if possible after a resulting quota limit increase (if the increase was sufficient).

For example, if a particular write operation would cause quota entity 140 to exceed first quota limit 170 on storage segment 112, then a storage node managing storage segment 112 may provide quota arbitrator 121 a request 180 for an increased quota limit for quota entity 140 on storage segment 112. In some examples, the storage node sending request 180 may be implemented on computing device 100 or implemented separate from computing device 100. In other examples, the storage node may provide a request for an increased quota limit for a given storage segment at other suitable times, even if a present write operation may be satisfied without exceeding a current quota limit or any given soft threshold or limit less than the current quota limit, as described below in relation to FIG. 2.

In the example of FIG. 1, instructions 122 may receive the request 180 for the increased quota limit for quota entity 140. In response to the request 180, instructions 122 may obtain, for each of a plurality of storage segments of DFS 111 associated with quota entity 140, a current amount of storage used by quota entity 140 on the storage segment. In some examples, in response to request 180, instructions 122 may provide, to the storage nodes managing the storage segments, requests for the current amount of storage used by the quota entity 140 on the storage segments. In such examples, instructions 122 may in response acquire (i.e., receive, retrieve, etc.) the respective current usage for quota entity 140 for each of the storage segments from the storage nodes and store the acquired amount(s) of storage used in memory of computing device 100. In such examples, a storage node may provide the current usage amount(s) for the storage segments it manages. In such examples, instructions 122 may provide separate usage requests to multiple different storage nodes, and may receive at least one response with the usage information from each storage node.

In some examples, instructions 122 may obtain the respective current amount of storage used by quota entity 140 on each storage segment of DFS 111 with which quota entity 140 is associated. In some examples, a quota entity of DFS 111 may be associated with a particular non-empty subset of the storage segments of DFS 111. The storage segments with which a quota entity is associated may be defined in any suitable manner. For example, a quota entity may be associated with at least one of (1) each storage segment indicated as being associated with the quota entity in the DFS, (2) each storage segment on which quota entity is authorized to store data, (3) each storage segment on which data has been stored for the quota entity, or the like, or a combination thereof.

In such examples, quota arbitrator 121 may store information sufficient to determine which storage segments are associated with quota entity 140, and instructions 122 may in such examples obtain the current usage at each of these particular storage segments in response to request 180 based on the information. In such examples, in response to request 180, instructions 122 may determine the particular subset of the storage segments for which to obtain current usage amounts for quota entity 140, and provide requests for current usage for the quota entity 140 to the storage nodes managing those particular storage segments. In some examples, at least one of the storage nodes to which instructions 122 provide a request may be implemented on computing device 100.

In other examples, instructions 122 may obtain the current amount of storage used by quota entity 140 on the storage segments associated with quota entity 140 by obtaining the current amounts of storage used by quota entity 140 on each storage segment of DFS 111, respectively (as the particular storage segments associated with quota entity 140 would be included in the group of all storage segments of DFS 111). In examples described herein, a "current" or "present" amount of storage used by a quota entity on a storage segment may be an amount of storage used on the storage segment at the time that amount of storage used on the storage segment is requested by or provided to a quota arbitrator.

In the example of FIG. 1, instructions 124 may determine a global available quota amount for quota entity 140 across all the storage segments based on the obtained current amounts of storage used by quota entity 140 and global quota 141 for quota entity 140. In such examples, instructions 124 may aggregate all of the acquired amounts of current storage used for quota entity 140 at the various storage segments of DFS 111. Instructions 124 may then determine a difference between the global quota 141 for quota entity 140 and the determined aggregate of the acquired amounts of storage used for quota entity 140 (e.g., by subtracting the aggregated amount from the global quota 141) to determine the global available quota amount for quota entity 140. In examples described herein, a "global available quota amount" for a quota entity at a given point in time is the cumulative amount of storage that may be used across all storage segments of a DFS, in addition to current amounts of storage used, without exceeding the global quota. For example, the global available quota amount may be the remainder of the global quota for a quota entity that is not used by the quota entity.

In the example of FIG. 1, instructions 126 may assign each of the plurality of storage segments associated with quota entity 140 a respective second quota limit for quota entity 140, the second quota limits being based on a division of all or less than all of the determined global available quota amount. In such examples, instructions 126 may divide the determined global available quota amount among the storage segments associated with quota entity 140. In some examples, instructions 126 may divide all or less than all of the determined global available quota amount among the associated storage segments evenly or unevenly according to a determined weighting. Then, for each of the associated storage segments, instructions 126 may determine a respective second quota limit for the storage segment that is equivalent to the sum of the current usage by quota entity 140 and the divided portion of the global available quota amount determined for the storage segment. Instructions 126 may then provide the respective second quota limits determined for the associated storage segments to the storage nodes managing the storage segments to replace the first quota limits assigned to the storage segments. In this manner, by the methodology described above in relation to instructions 126, instructions 126 may assign each of the associated storage segments a respective second quota limit for the given quota entity, the second quota limits being based on a division of all or less than all of the global available quota amount.

As an example, in the example of FIG. 1, instructions 126 may determine second quota limits for the associated storage segments, as described above, including at least a second quota limit 190 for quota entity 140 on storage segment 112 (to replace first quota limit 170) and a second quota limit 192 for quota entity 140 on storage segment 114, and may provide second quota limits 190 and 192 to respective storage node(s) to replace first quota limits 170 and 172 assigned to storage segments 112 and 114, respectively.

As an illustrative numerical example, the storage segments associated with quota entity 140 may be storage segments 112 and 114 of DFS 111, and global quota 141 for quota entity 140 may be 1000 MB, first quota limit 170 may be 500 MB and second quota limit 172 may be 500 MB. At given time, the amount of storage used by quota entity 140 at storage segment 112 may be 500 MB and at storage segment 114 may be 250 MB. In an example, when a further write operation is desired on storage segment 112 for quota entity 140, the storage node managing storage segment 112 may determine that a further write may exceed first quota limit 170 and provide a request 180 to quota arbitrator 121 to increase the quota limit for quota entity 140 on storage segment 112.

In such examples, instructions 122 may receive the request 180 and in response obtain the current amount of storage used by quota entity 140 on each of the storage segments associated with quota entity 140, as described above. In this example, the associated storage segments are storage segments 112 and 114, and the usage amounts obtained are 500 MB for storage segment 112 and 250 MB for storage segment 114.

In such examples, as described above, instructions 124 may determine a global available quota amount of 250 MB for quota entity 140 across all the storage segments, based on the obtained current amounts of storage used by the given quota entity (i.e., an aggregate of 750 MB) and global quota 140, which is 1000 MB. In such an example, instructions 126 may assign associated storage segments 112, 114 second quota limits 190, 192 for quota entity 140, as described above. For example, instructions 126 may divide all of the global available quota amount (i.e., 250 MB) evenly between the associated storage segments 112, 114, (i.e., 125 MB each), and add those amounts to the obtained current usage amounts, to arrive at a second quota limit 190 of 625 MB for instructions 126 to assign to storage segment 112 (to replace first quota limit 170) and a second quota limit 192 of 375 MB to storage segment 114 (to replace first quota limit 172). In this manner, after the quota limit at storage segment 112 is increased, the write operation that triggered 180 may proceed on storage segment 112 (if it is a write of no more than 125 MB).

In some examples, instructions 126 may, for each of the storage segments associated with a quota entity 140, assign the storage segment a second quota limit that is different than the first quota limit that it replaces. In some examples, when determining second quota limits for quota entity 140, instructions 126 may determine whether the global available quota amount for quota entity 140 is greater than a threshold amount.

In some examples, based on a determination that the determined global available quota amount is greater than the threshold amount, instructions 126 may divide all of the global available quota amount between the associated storage segments. In such examples, based on a determination that the determined global available quota amount is not greater than the threshold amount, instructions 126 may divide less than all of the global available quota amount between the associated storage segments (i.e., may maintain some of the quota amount in reserve). The threshold amount may be any suitable value expressed in any suitable manner (e.g., absolute value, as a percentage of a global quota, etc.). For example, the threshold may be 10% of a global quota for the quota entity. In some examples this may be determined directly (i.e., by comparing the global available amount to the threshold), indirectly by evaluating the cumulative current usage for the quota entity, or in any other suitable manner.

For example, taking the numerical example described above, the global available quota amount of 250 MB is greater than 10% of global quota 141, which is 1000 MB. In such examples, based on the determination that the global available quota amount is greater than the threshold, instructions 126 may divide all of the global available quota amount among the associated storage segments in determining the second quota limits, as described above.

In another example in which the global available quota amount is 90 MB, instructions 126 may determine that the global available quota amount is not greater than 10% of global quota 141 (1000 MB), and as such may divide less than all of the global available quota amount among the segments. For example, instructions 126 may divide 80% of the global available quota amount (i.e., 72 MB) among the segments, retaining the other 20% (i.e., 18 MB). The amount to retain may be any suitable amount expressed in any suitable manner (i.e., absolute, percentage, etc.). In addition, several such global available quota amount thresholds may be set, such that smaller amounts are distributed out as the global threshold is reached, for example. For example, in another numerical example in which the global available quota amount is 40 MB, instructions 126 may determine that the global available quota amount is not greater than another threshold, such as 5% of global quota 141 (1000 MB), and as such instructions 126 may divide only 50% of the global available quota amount (or 20 MB) among the storage segments.

As described above, instructions 126 may divide the global available quota amount among the associated storage segments evenly, as illustrated in the numerical examples above. In other examples, instructions 126 may divide the global available quota amount among the associated storage segments unevenly, such as according to an unequal weighting between the associated storage segments, for example. In such examples, instructions 126 may determine an unequal weighting for division of the global available quota amount to the storage segments, and divide all or less than all of the global available quota amount between the storage segments based on the determined unequal weighting, to determine the second quota limits. For example, instructions 126 may determine the unequal weighting for the storage segments proportional to current storage usage amounts for the associated storage segments, respectively, or proportional to current storage usage rates for the associated storage segments, respectively.

As an illustrative numerical example with reference to FIG. 1, instructions 122 may obtain current usage amounts of 500 MB and 250 MB for storage segments 112 and 114 associated with quota entity 140, respectively, as described above. In such an examples, instructions 124 may determine a global available quota amount of 250 MB for quota entity 140 across all the storage segments, based on the obtained current amounts of storage used by quota entity 140 (i.e., an aggregate of 750 MB) and global quota 140 (i.e., 1000 MB). In such an example, instructions 126 may determine the unequal weighting for the storage segments proportional to current storage usage amounts for the associated storage segments, respectively. For example, instructions 126 may compare the current usage amounts obtained for storage segments 112 and 114 and determine that storage segment 112 has used twice as much storage as storage segment 114 for quota entity 140 (i.e., ratio of 2:1). As such, instructions 126 may determine an unequal weighting of 2:1 for division of the global available quota amount (i.e., proportional to the current usage), and may divide all or less than all of the global available quota amount between the associated storage segments 112 and 114 according to this unequal weighting. For example, when dividing less than all of the global available quota amount between the storage segments (i.e., 90% or 225 MB of the global available quota amount), instructions 126 may divide the 90% of the global available quota amount so that twice as much is used for storage segment 112 (i.e., 150 MB) than for storage segment 114 (i.e., 75 MB). In such examples, instructions 126 may determine a second quota limit 190 of 650 MB for storage segment 112, and a second quota limit 192 of 325 MB for storage segment 114, while quota arbitrator 121 holds back 25 MB (or 10% of the global available quota limit).

As noted above, in other examples, instructions 126 may determine the unequal weighting for the storage segments proportional to current storage usage rates for the associated storage segments, respectively. For example, instructions 126 may store previous storage usage amount for segments associated with quota entity 140, and compare these to the current usage amounts when obtained to determine a rate of storage usage. As a numerical example, global quota may again be 1000 MB, and instructions 126 may store a prior usage amount of 100 MB for quota entity 140 on storage segment 112 and a prior usage amount of 150 MB for quota entity 140 on storage segment 114.

In such an example, instructions 122 may obtain a current storage usage amount of 500 MB for quota entity 140 on storage segment 112, and a current storage usage amount of 250 MB for quota entity 140 on storage segment 114. In such examples, instructions 124 may again determine a global available quota amount of 250 MB, and instructions 126 may determine that the rate of usage of storage segment 112 is four times that of storage segment 114 since the prior usage amount, since usage of storage segment 112 increased from 100 MB to 500 MB (i.e., by 400 MB), which usage of storage segment 114 increased from 150 MB to 250 MB (i.e., by 100 MB). In such examples, instructions 126 may divide all or less than all of the global available quota amount between storage segments 112 and 114 in an unequal weighting of 4:1 based on the usage rates. For example, instructions 126 may divide all of the global available quota amount (or 250 MB) such that 200 MB goes to the second quota limit 190 (yielding a second quota limit 190 of 700 MB) and 50 MB goes to the second quota limit 192 (yielding a second quota limit 192 of 300 MB).

In some examples, in addition to responding to requests for increased quota limits, as described above, quota arbitrator 121 may periodically obtain current usage amounts from storage segments of DFS 111. For example, instructions 122 may determine when a predetermined amount of time has expired since the previous periodic request for current usage amounts. In such examples, in response to expiration of the predetermined amount of time, instructions 122 may obtain from storage nodes managing the storage segments of DFS 111 a present amount of storage used on each storage segment by each of a plurality of quota entities of DFS 111, including quota entity 140. For example, instructions 122 may determine the present amount of storage used for each quota entity of DFS 111 across all storage segments of DFS 111. These present usage amounts may be obtained as described above in relation to instructions 122, and may be obtained in relation to all global quotas for all quota entities of DFS 111. In examples described herein, the predetermined amount of time may be 30 seconds, 60 seconds, or any other suitable amount of time.

In such examples, instructions 124 may determine a present global available quota amount for each of the plurality of quota entities across all the storage segments based on the obtained present amounts of storage used and global quotas for each of the quota entities. In such examples, instructions 124 may determine the present global available quota amounts as described above in relation to instructions 124, and may determine them in relation to all global quotas for all quota entities of DFS 111.

In such examples, instructions 126 may determine whether present usage for a particular one of the quota entities on one of the storage segments has met or exceeded a defined threshold relative to a present quota limit for the particular quota entity on the storage segment (e.g., 90% or 95% of the quota limit). In response to a determination that usage for a particular one of the quota entities has met or exceeded the defined threshold, instructions 126 may assign each of the plurality of storage segments a respective new quota limit for the particular quota entity, the new quota limits being based on a division of all or less than all of the present global available quota amount for the particular quota entity, as described above in relation to instructions 126. In such examples, as a result of the periodic collection of usage amounts, quota arbitrator 121 may proactively update any set(s) of quota limits for a quota entity that may be near reaching a quota limit on one of the storage segments.

Some examples are described herein in terms of a subset of storage segments associated with a given quota entity. In other examples, all storage segments of the DFS may be associated with a given quota entity, such that the quota entity is entitled to store data to any of the storage segments of the DFS.

As used herein, a "computing device" may be a desktop computer, laptop (or notebook) computer, workstation, tablet computer, mobile phone, smart device, switch, router, server, blade enclosure, or any other processing device or equipment including a processing resource. In examples described herein, a processing resource may include, for example, one processor or multiple processors included in a single computing device or distributed across multiple computing devices.

As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described above in relation to instructions 121, 122, 124, and 126. In other examples, the functionalities of any of the instructions of storage medium 120 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 1A, storage medium 120 may be implemented by one machine-readable storage medium, or multiple machine-readable storage media.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

In some examples, instructions 121, 122, 124, and 126, may be part of an installation package that, when installed, may be executed by processing resource 110 to implement the functionalities described above. In such examples, storage medium 120 may be a portable medium, such as a CD, DVD, or flash drive, or a memory maintained by a server from which the installation package can be downloaded and installed. In other examples, instructions 121, 122, 124, and 126 may be part of an application, applications, or component(s) already installed on computing device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-4.

FIG. 2 is a block diagram of an example DFS 211 including storage nodes to manage storage segments, and a quota arbitrator 221 to provide quota limits for quota entities on storage segments. In the example of FIG. 2, DFS 211 includes a storage node 200 to manage at least one storage segment (including at least storage segments 212 and 214 in the example of FIG. 2), and a storage node 202 to manage at least one storage segment (including at least storage segments 216 and 218 in the example of FIG. 2).

Storage node 200, which may be implemented by at least one computing device, includes a system 220 implemented at least in part by engines 222-225, which may be any combination of hardware and programming to implement the functionalities of the engines described herein. System 220 may implement a quota arbitrator 221, implemented at least in part by engines 222-224 and utilizing global quota data 232 of memory 230 of storage node 200. System 220 may also include an enforce engine 225 to manage at least one storage segment of DFS 211 (e.g., at least storage segments 212 and 214 in the example of FIG. 2) utilizing enforcement data 234 stored in memory 230 of storage node 200. In examples described herein, data 232 and 234 may be stored on the same machine-readable storage medium of storage node 200, or on different machine-readable storage media of storage node 200.

Storage node 202, which may be implemented by at least one computing device, includes an enforce engine 262 to manage at least one storage segment of DFS 211 (e.g., at least storage segments 216 and 218 in the example of FIG. 2) utilizing enforcement data 274 stored in memory 270 of storage node 202.

In the example of FIG. 2, DFS 211 may store global quotas assigned to a plurality of quota entities of DFS 211, respectively, as described above in relation to DFS 111. Quota arbitrator 221 of DFS 211 may store the global quotas in any suitable manner such that they are accessible to quota arbitrator 121. Quota arbitrator 221 may store at least one global quota in memory 230 among global quota data 232, including a global quota 241 for a quota entity 240 of DFS 211, and a global quota 243 for a quota entity 242 of DFS 211, in the example of FIG. 2. In some examples, global quota data 232 may include additional global quotas, including global quota for other quota entities, multiple different global quotas for particular quota entities, or a combination thereof.

As described above in relation to DFS 111, for each global quota assigned to a given quota entity, all or less than all of the global quota may be divided into a plurality of quota limits assigned to respective storage segments of DFS 211 and which, when aggregated, do not exceed the global quota. In some examples, for each storage segment, the quota limits assigned to that storage segment may be maintained by a storage node that manages the storage segment. In such examples, the storage node may maintain and enforce each current quota limit assigned to the storage segment.

For purposes of illustration, examples discussed with reference to FIG. 2 may be explained in relation to a global quota 241 and respective quota limits (based on that global quota 241) for a given quota entity 240 of DFS 211. In examples described herein, enforcement data may be used by a storage node to manage storage segments of the DFS.

In the example of FIG. 2, some or all of global quota 241 may be divided into first quota limits for storage segments of DFS 211, including at least first quota limits 212-1, 214-1, 216-1, and 218-1 assigned to storage segments 212, 214, 216, and 218, respectively, for quota entity 240. As described above, these first quota limits may be used by storage nodes managing storage segments as a local limit on the amount of storage that quota entity 240 may use on particular storage segments. In some examples, other storage segments of DFS 211 may also be assigned respective first quota limits for quota entity 240 relative to global quota 241, wherein the aggregate of all the first quota limits (including 212-1, 214-1, 216-1, and 218-1) is no greater than global quota 241.

In the example of FIG. 2, first quota limit 212-1 is stored in enforcement data 234 and associated with storage segment 212 and quota entity 240 there, and first quota limit 214-1 is stored in enforcement data 234 and associated with storage segment 214 and quota entity 240 there. These first quota limits 212-1 and 214-1 of enforcement data 234 may be used by storage node 200 for enforcement of these quota limits, as described above in relation to DFS 111.

For example, enforce engine 225 of storage node 200 may prevent any write operation to at least segments 212 and 214 that would cause a quota limit that is currently in force for these segments to be exceeded, or in other examples, that would cause a soft limit or threshold less than the current quota limit (e.g., 90% or 95% of the quota limit) to be exceeded. Enforce engine 225 may also maintain, for each storage segment that it manages, the amount(s) of storage used on the storage segment for each quota entity that has associated data stored on the storage segment. For example, enforcement data 234 includes usage data 212-0, defining the amount of storage on segment 212 used by quota entity 240, and usage data 214-0, defining the amount of storage on segment 214 used by quota entity 240.

Referring to storage node 202, in the example of FIG. 2, first quota limit 216-1 is stored in enforcement data 274 and associated with storage segment 216 and quota entity 240 there, and first quota limit 218-1 is stored in enforcement data 274 and associated with storage segment 218 and quota entity 240 there. These first quota limits 216-1 and 218-1 of enforcement data 274 may be used by storage node 202 for enforcement of these quota limits, as described above in relation to DFS 111. For example, enforce engine 262 of storage node 202 may prevent any write operation to at least segments 216 and 218 that would cause a quota limit that is currently in force for these segments to be exceeded, or in other examples, that would cause a soft limit or threshold less than the current quota limit to be exceeded, as described above in relation to enforce engine 225. Enforce engine 262 may also maintain, for each storage segment that it manages, the amount(s) of storage used on the storage segment for each quota entity that has associated data stored on the storage segment. For example, enforcement data 274 includes usage data 216-0, defining the amount of storage on segment 216 used by quota entity 240, and usage data 218-0, defining the amount of storage on segment 218 used by quota entity 240. In the example of FIG. 2, each of enforce engine 225 (using enforcement data 234) and enforce engine 262 (using enforcement data 274) may enforce the first quota limits, as described above in relation to storage nodes of DFS 111.

In the example of FIG. 2, if allowing a write on segment 216 for quota entity 240 would cause either the actual first quota limit 216-1 or a soft or threshold limit based on quota limit 216-1 to be exceeded, then enforce engine 262 may not allow or perform the write operation immediately. Rather, enforce engine 262 may request an increased quota limit for quota entity 240 on the given storage segment 216, and, for example, complete the write operation if possible after a resulting quota limit increase (if the increase was sufficient). In such examples, enforce engine 262 may provide a request 280 to quota arbitrator 221 requesting an increased quota limit for quota entity 240 on storage segment 216. The request 280 may indicate that the request relates to quota entity 240. In other examples, the storage node may provide a request for an increased quota limit for a given storage segment at other suitable times, even if a present write operation may be satisfied without exceeding a current quota limit or any given soft threshold or limit less than the current quota limit. For example, a storage node may request an increased quota limit for a given storage segment in response to determining that a relatively large amount of the last provided quota limit has been used in a relatively short amount of time since receiving the quota limit (even though a present write request may be satisfied without exceeding the quota limit or a soft threshold before it). In such examples, the relatively large amount of the quota limit may be determined in any suitable manner (e.g., usage rate, absolute usage amount or percentage of usage relative to the current quota limit, etc.), and the relatively short amount of time may be determined in any suitable manner (e.g., amount of time since receiving the current quota limit, etc.). As an example, if a storage node were to receive a quota limit of 300 MB for a storage segment and within a relatively short amount of time use 250 MB of that limit, then enforce engine 262 may request an increased quota limit for the storage node having 50 MB of quota left (even though a current write of 10 MB, for example, may be satisfied).

In the example of FIG. 2, engine 222 may receive the request 280 for the increased quota limit for quota entity 240. In response to the request 280, engine 222 may obtain, for each of a plurality of storage segments of DFS 211 associated with quota entity 240 indicated in request 280, a current amount of storage used by quota entity 240 on the storage segment. For example, in response to request 280, engine 222 may provide, to the storage nodes 200 and 202 managing storage segments 212, 214, 216, and 218, requests 282 for the current amount of storage used by quota entity 240 on storage segments 212, 214, 216, and 218 associated with quota entity 240. In examples described herein, a quota entity of a DFS may be associated with any particular non-empty subset of storage segments of the DFS, as described above in relation to DFS 111.

In such examples, engine 222 may in response acquire (i.e., receive, retrieve, etc.) the current usage 212-0 and 214-0 for quota entity 240 on storage segments 212 and 214, respectively, and the current usage 216-0 and 218-0 for quota entity 240 on storage segments 216 and 218, respectively. For example, engine 222 may receive reports 284 of this usage from each of the storage nodes (e.g., storage nodes 200 and 202). In some examples, enforce engine 225 may provide such a usage report 284 to engine 222 of quota arbitrator 221 (even though they may be implemented on the same storage node 200. In such examples, engine 222 may store the acquired amount(s) of storage used in memory of storage node 200 (e.g., memory 230) for use by quota arbitrator 221. In such examples, a storage node may provide the current usage amount(s) for the storage segments it manages. In such examples, engine 222 may provide separate usage requests to multiple different storage nodes, and may receive at least one response with the usage information from each storage node.

In some examples, request engine 222 may use the above-described technique(s) to obtain a current amount of storage used by a given quota entity on the storage segments of a DFS, in response to each received request for an increased quota limit for the given quota entity (when the storage usage for the given quota entity has not reached the global quota for the given quota entity). In some examples, request engine 222 may receive the request 280 from enforce engine 225 (even though both may be implemented on storage node 200). In such examples, enforce engine 225 may provide the request 280 for an increased quota limit on a given storage segment in response to a determination that a present write request cannot be satisfied (as described above), or based on any other suitable determination as described above (e.g., a high usage rate observed for the storage segment, even though a present write request may be satisfied).

In the example of FIG. 2, global engine 223 may determine a global available quota amount for quota entity 240 across all the associated storage segments (212, 214, 216, and 218) based on the obtained amounts of storage used by quota entity 240 (212-0, 214-0, 216-0, and 218-0) and global quota 241. In such examples, engine 223 may aggregate all of the acquired amounts of current storage (e.g., 212-0, 214-0, 216-0, and 218-0) used for quota entity 240 at the various storage segments (e.g., 212, 214, 216, and 218) of DFS 211. Engine 223 may then determine a difference between the global quota 214 for quota entity 240 and the determined aggregate of the acquired amounts of storage used for quota entity 240 (e.g., by subtracting the aggregated amount from the global quota 241) to determine the global available quota amount for quota entity 240.

In the example of FIG. 2, quota engine 224 may in response to request 280, provide second quota limits (e.g., 212-2, 214-2, 216-2, and 218-2) for quota entity 240 to a plurality of storage nodes (e.g., 200 and 202) managing the associated storage segments (e.g., 212, 214, 216, and 218) to replace the respective first quota limits (e.g., 212-1, 214-1, 216-1, and 218-1) for quota entity 240 on the storage segments, as described above in relation to DFS 111. In such examples, the second quota limits may be based on a division of all or less than all of the determined global available quota amount. In some examples, each of the second quota limits may be different than the respective first quota limit that it replaces.

In the example of FIG. 2, engine 224 may divide the determined global available quota amount among the storage segments associated with quota entity 240, as described above in relation to DFS 111. In some examples, engine 224 may divide all or less than all of the determined global available quota amount among the associated storage segments evenly, or unevenly according to a determined weighting, as described above. Then, for each of the associated storage segments, engine 224 may determine a respective second quota limit for the storage segment that is equivalent to the sum of the current usage by quota entity 140 and the divided portion of the global available quota amount determined for the storage segment. Engine 224 may then provide the respective second quota limits determined for the associated storage segments to the storage nodes managing the storage segments to replace the first quota limits assigned to the storage segments. In this manner, by the methodology described above in relation to engine 224, engine 224 may provide the second quota limits to replace the first quota limits, the second quota limits being based on a division of all or less than all of the global available quota amount.

As an example, in the example of FIG. 2, engine 224 may determine second quota limits 212-2, 214-2, 216-2, and 218-2 for the associated storage segments 212, 214, 216, and 218, respectively, as described above in relation to DFS 111. Engine 224 may provide second quota limits 212-2 and 214-2 to enforce engine 225 of storage node 200 so that enforce engine 225 may use them to replace first quota limits 212-1 and 214-1, thereby assigning second quota limits to storage segments 212 and 214. Engine 224 may provide second quota limits 216-2 and 218-2 to enforce engine 262 of storage node 202 so that enforce engine 262 may use them to replace first quota limits 216-1 and 218-1, thereby assigning second quota limits to storage segments 216 and 218.

In some examples, engine 224 may determine an unequal weighting for division of the global available quota amount to the storage segments, as described above in relation to DFS 111. In some examples, engine 224 may divide all or less than all of the global available quota amount between the storage segments based on the determined unequal weighting, as described above in relation to DFS 111. In some examples, engine 224 may determine whether a global available quota amount is greater than a threshold amount. Based on a determination that the determined global available quota amount is not greater than a threshold amount, engine 224 may divide less than all of the global available quota amount between the storage segments to define the second quota limits, as described above in relation to DFS 111. Based on a determination that the determined global available quota amount is greater than a threshold amount, engine 224 may divide all of the global available quota amount between the storage segments to define the second quota limits, as described above in relation to DFS 111.

In some examples, request engine 222 may determine when a predetermined amount of time has expired since a prior periodic usage update. In such examples, in response to expiration of the predetermined amount of time, engine 222 may obtain a current amount of storage used by a plurality of quota entities in the DFS (i.e., including quota entity 240), as described above in relation to DFS 111. In such examples, quota arbitrator 221 may further determine whether any usage amount for a quota entity is sufficiently near a corresponding quota limit for the quota entity, and if so may use the collected usage information to determine new quota limits for the quota entity, as described above in relation to DFS 111.

System 220 may include at least engines 222-225, which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of system 220. In some examples, the at least one machine-readable storage medium may store instructions that, when executed by the at least one processing resource, at least partially implement some or all engines of system 220. In such examples, system 220 may include the at least one machine-readable storage medium storing the instructions and the at least one processing resource to execute the instructions.

In some examples, the instructions can be part of an installation package that, when installed, can be executed by the at least one processing resource to at least partially implement at least some of the engines of system 220. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on networking device 200 including the processing resource. In such examples, the machine-readable storage medium may include memory such as a hard drive, solid state drive, or the like. In other examples, the functionalities of any engines of system 220 may be at least partially implemented in the form of electronic circuitry.

In example described herein, enforce engine 262 may be any combination of hardware and programming to implement the functionalities of engine 262 described herein. In other examples, the functionalities of any engines of engine 262 may be at least partially implemented in the form of electronic circuitry. In some examples, functionalities described herein in relation to FIG. 2 may be provided in combination with functionalities described herein in relation to any of FIGS. 1, 3, and 4.

Figure 3:
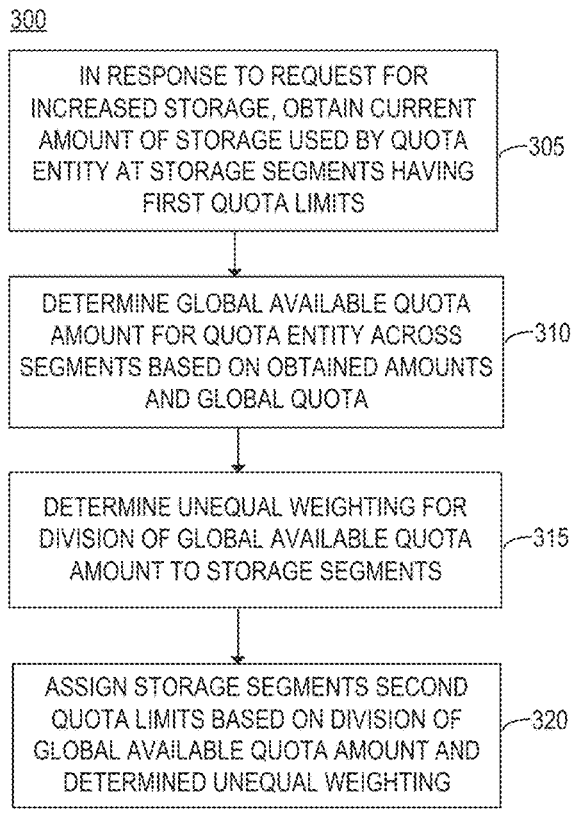
FIG. 3 is a flowchart of an example method of a quota arbitrator of a DFS, the method including assigning each of a plurality of storage segments a respective quota limit for a given quota entity.

FIG. 3 is a flowchart of an example method 300 of a quota arbitrator of a DFS, the method including assigning each of a plurality of storage segments a respective quota limit for a given quota entity. Although execution of method 300 is described below with reference to computing device 100 and DFS 111 of FIG. 1, other suitable systems for the execution of method 300 may be utilized (e.g., quota arbitrator 221 of DFS 211 of FIG. 2). Additionally, implementation of method 300 is not limited to such examples.

At 305 of method 300, in response to a request for an increased quota limit for a given quota entity on a given storage segment, instructions 122 may obtain, for each of a plurality of storage segments of DFS 111 associated with the given quota entity, a current amount of storage used by the given quota entity on the storage segment, as described above in relation to FIG. 1. In such examples, the given quota entity has a global quota for DFS 111 and each of the storage segments is assigned a respective first quota limit for the given quota entity.

At 310, instructions 124 may determine a global available quota amount for the given quota entity across all the storage segments based on the obtained amounts of storage used by the given quota entity and the global quota, as described above in relation to FIG. 1. At 315, instructions 124 may determine an unequal weighting for division of the global available quota amount to the storage segments, as described above in relation to FIG. 1.

At 320, instructions 126 may assign each of the plurality of storage segments a respective second quota limit for the given quota entity, wherein the second quota limits are based on a division of all or less than all of the global available quota amount and the determined unequal weighting, as described above in relation to FIG. 1.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2 and 4.

Figure 4:
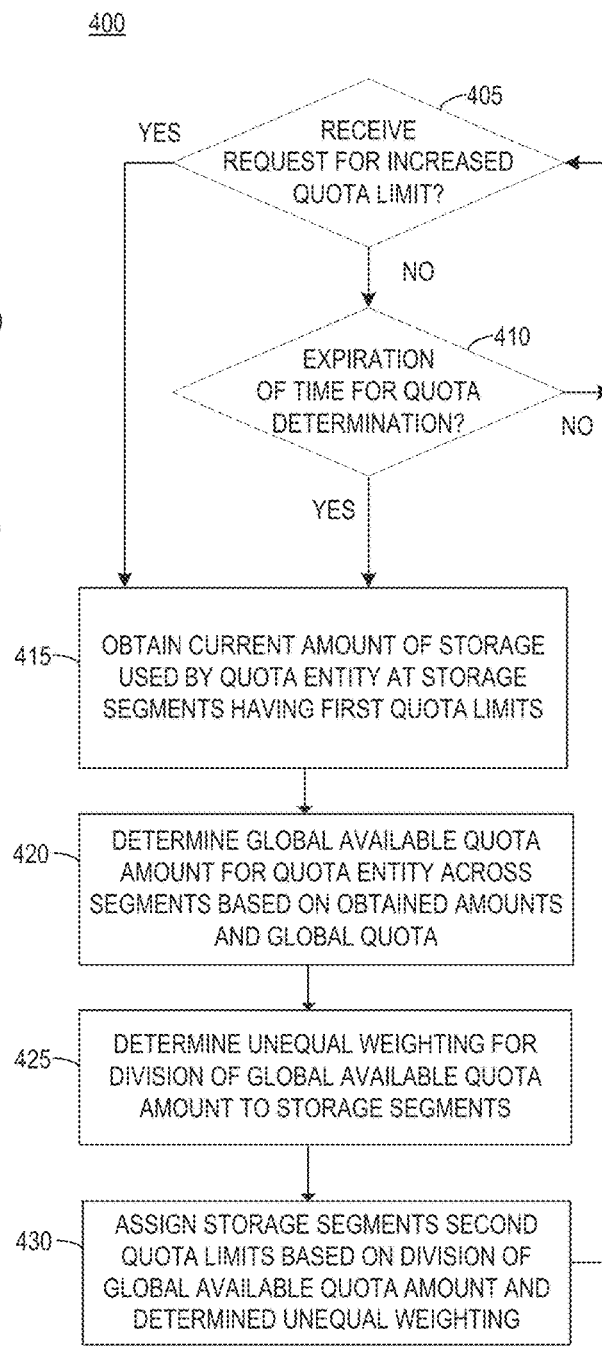
FIG. 4 is a flowchart of an example method of a quota arbitrator of a DFS, the method including obtaining current storage usage amounts in response to a request or expiration of a predetermined amount of time.

FIG. 4 is a flowchart of an example method 400 including obtaining current storage usage amounts in response to a request or expiration of a predetermined amount of time. Although execution of method 400 is described below with reference to computing device 100 of FIG. 1, other suitable systems for the execution of method 400 may be utilized (e.g., quota arbitrator 221 of FIG. 2). Additionally, implementation of method 400 is not limited to such examples.

At 405 of method 400, instructions 122 may determine whether a request for an increased quota limit has been received by quota arbitrator 121. If so, then method 400 may proceed to 415. If not, then at 410, instructions 122 may determine whether a predetermined amount of time has expired (i.e., elapsed) since a last periodic collection of storage segment usage data. If not, then method 400 may return to 405. If so, then method 400 may proceed to 415. In examples described herein, the predetermined amount of time may be 30 seconds, 60 seconds, or any other suitable amount of time.

At 415, in response to a request for an increased quota limit for a given quota entity on a given storage segment, instructions 122 may obtain, for each of a plurality of storage segments of DFS 111 associated with the given quota entity, a current amount of storage used by the given quota entity on the storage segment, as described above in relation to FIG. 1. In such examples, the given quota entity has a global quota for DFS 111 and each of the storage segments is assigned a respective first quota limit for the given quota entity.

At 415, instructions 122 may also obtain current amount of storage used by the given quota entity on each associated storage segment in response to the expiration of the predetermined amount of time. However, instructions 122 may further obtain a present amount of storage used on each storage segment by each of a plurality of quota entities, including the given quota entity, as described above in relation to FIG. 1.

At 420, instructions 124 may determine a global available quota amount for the given quota entity across all the storage segments based on the obtained amounts of storage used by the given quota entity and the global quota, as described above in relation to FIG. 1. At 425, instructions 124 may determine an unequal weighting for division of the global available quota amount to the storage segments, as described above in relation to FIG. 1. For example, instructions 124 may determine this unequal weighting in response to a request at 405, or in response to expiration of the predetermined amount of time at 410 when instructions 124 further determine that a given usage amount is near to a quota limit for a quota entity.

At 430, instructions 126 may assign each of the plurality of storage segments a respective second quota limit for the given quota entity, wherein the second quota limits are based on a division of all or less than all of the global available quota amount and the determined unequal weighting, as described above in relation to FIG. 1. In some examples, instructions 126 may determine the unequal weighting for the storage segments proportional to current storage usage amounts for the storage segments, respectively, as described above in relation to FIG. 1. In other examples, instructions 126 may determine the unequal weighting for the storage segments proportional to current storage usage rates for the storage segments, respectively, as described above in relation to FIG. 1.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3. All of the features disclosed in this specification (including any accompanying claims, abstract and drawings), and/or all of the elements of any method or process so disclosed, may be combined in any combination, except combinations where at least some of such features and/or elements are mutually exclusive.

What is claimed is:

1. An article comprising at least one non-transitory machine-readable storage medium comprising instructions of a quota arbitrator of a distributed file system (DFS), the instructions executable by a processing resource of a computing device to:

in response to a request for an increased quota limit for a given quota entity on a given storage segment, obtain:
for each of a plurality of storage segments of the DFS associated with the given quota entity, a current amount of storage used by the given quota entity on the storage segment, wherein the given quota entity has a global quota for the DFS and each of the storage segments is assigned a respective first quota limit for the given quota entity, and from storage nodes managing the storage segments a present amount of storage used on each storage segment by each of a plurality of quota entities, including the given quota entity, in response to expiration of a predetermined amount of time;

determine a global available quota amount and a present global available quota amount, wherein the global quota amount is for the given quota entity across all the storage segments based on the obtained current amounts of storage used by the given quota entity and the global quota, and wherein the present global available quota amount is for each of the plurality of quota entities across all the storage segments based on the obtained present amounts of storage used and global quotas for each of the quota entities; and assign each of the plurality of storage segments a respective second quota limit for the given quota entity and a respective third quota limit for the particular quota entity, the second quota limits being based on a division of all or less than all of the global available quota amount and the third quota limits being based on a division of all or less than all of the present global available quota amount for the particular quota entity, wherein the third quota limits are assigned in response to a determination that usage for a particular one of the quota entities on one of the storage segments has met or exceeded a defined threshold.

2. The article of claim 1, wherein, for each of the storage segments, the second quota limit for the given quota entity for the storage segment is different than the first quota limit for the given quota entity for the storage segment.

3. The article of claim 1, wherein the instructions to assign comprise instructions to:
based on a determination that the determined global available quota amount is greater than a threshold amount, divide all of the global available quota amount between the storage segments.

4. The article of claim 1, wherein the instructions to assign comprise instructions to:
determine an unequal weighting for division of the global available quota amount to the storage segments; and
divide all or less than all of the global available quota amount between the storage segments based on the determined unequal weighting.

5. The article of claim 1, wherein:
the given quota entity is one of a user, a group, and a directory defined for the DFS; and
the amounts of storage are expressed in one of bytes, blocks, and files.

6. A system implementing a quota arbitrator of a distributed file system (DFS), the system comprising:
a processor; and
a machine-readable storage medium storing instructions, the instructions executable by the processor to execute;
a request engine to:
in response to a request for an increased quota limit, obtain, for each of a plurality of storage segments of the DFS associated with a given quota entity indicated in the request, a current amount of storage used by the given quota entity on the storage segment, wherein the given quota entity has a global quota for the DFS and each of the storage segments is assigned a respective first quota limit for the given quota entity; and
in response to expiration of a predetermined amount of time, obtain from storage nodes managing the storage segments a present amount of storage used on each storage segment by each of a plurality of quota entities, including the given quota entity;
a global engine to:
determine a global available quota amount for the given quota entity across all the storage segments based on the obtained amounts of storage used by the given quota entity and the global quota; and determine a present global available quota amount for each of the plurality of quota entities across all the storage segments based on the obtained present amounts of storage used and global quotas for each of the quota entities; and a quota engine to:
in response to the request, provide second quota limits for the given quota entity to a plurality of storage nodes managing the storage segments to replace the respective first quota limits for the given quota entity on the storage segments, the second quota limits being based on a division of all or less than all of the global available quota amount and each being different than the respective first quota limit that it replaces; and
in response to a determination that usage for a particular one of the quota entities on one of the storage segments has met or exceeded a defined threshold, assign each of the plurality of storage segments a respective third quota limit for the particular quota entity, the third quota limits being based on a division of all or less than all of the present global available quota amount for the particular quota entity.

7. The system of claim 6, wherein the request engine is to:
in response to each request for an increased quota limit for a given quota entity, obtain a current amount of storage used by the given quota entity on the storage segments of the DFS.

8. The system of claim 6, wherein:
the request is a request for an increased quota limit for the given quota entity on a given one of the storage segments;
the quota engine is to determine an unequal weighting for division of the global available quota amount to the storage segments; and
the quota engine is further to divide all or less than all of the global available quota amount between the storage segments based on the determined unequal weighting.

9. The system of claim 6, wherein the quota engine is to:
based on a determination that the determined global available quota amount is not greater than a threshold amount, divide less than all of the global available quota amount between the storage segments to define the second quota limits.

10. A method of a quota arbitrator of a distributed file system (DFS), the method comprising:
in response to a request for an increased quota limit for a given quota entity on a given storage segment, obtaining, by a processor, for each of a plurality of storage segments of the DFS associated with the given quota entity, a current amount of storage used by the given quota entity on the storage segment, wherein the given quota entity has a global quota for the DFS and each of the storage segments is assigned a respective first quota limit for the given quota entity;
in response to expiration of a predetermined amount of time, obtaining, by the processor, from storage nodes managing the storage segments a present amount of storage used on each storage segment by each of a plurality of quota entities, including the given quota entity;
determining, by the processor, a global available quota amount for the given quota entity across all the storage segments based on the obtained amounts of storage used by the given quota entity and the global quota;

determining, by the processor, an unequal weighting for division of the global available quota amount to the storage segments;

determining, by the processor, a present global available quota amount for each of the plurality of quota entities across all the storage segments based on the obtained present amounts of storage used and global quotas for each of the quota entities;

assigning, by the processor, in response to a determination that usage for a particular one of the quota entities on one of the storage segments has met or exceeded a defined threshold, each of the plurality of storage segments a respective third quota limit for the particular quota entity, the third quota limits being based on a division of all or less than all of the present global available quota amount for the particular quota entity; and assigning, by the processor, each of the plurality of storage segments a respective second quota limit for the given quota entity, the second quota limits being based on a division of all or less than all of the global available quota amount and the determined unequal weighting.

11. The method of claim 10, wherein determining the unequal weighting comprises:

determining, by the processor, the unequal weighting for the storage segments proportional to current storage usage amounts for the storage segments, respectively.

12. The method of claim 10, wherein determining the unequal weighting comprises:

determining, by the processor, the unequal weighting for the storage segments proportional to current storage usage rates for the storage segments, respectively.

13. The method of claim 10, further comprising:

based on a determination that the determined global available quota amount is not greater than a threshold amount, dividing, by the processor, less than all of the global available quota amount between the storage segments to define the second quota limits.

14. The method of claim 10, further comprising:

dividing, by the processor, all or less than all of the global available quota amount between the storage segments based on the determined unequal weighting.

15. The method of claim 10, further comprising:

determining, by the processor, an unequal weighting for division of the global available quota amount to the storage segments.

16. The method of claim 10, wherein the request is a request for an increased quota limit for the given quota entity on a given one of the storage segments.

* * * * *